(12) United States Patent
Satyavarapu et al.

(10) Patent No.: US 10,330,478 B2
(45) Date of Patent: Jun. 25, 2019

(54) NAVIGATION VIA SHORT MESSAGE SERVICE

(71) Applicant: CA, Inc., New York, NY (US)

(72) Inventors: Surya Kiran Satyavarapu, Hyderabad (IN); Prashant Singh, Hyderabad (IN)

(73) Assignee: CA, Inc., New York, NY (US)

( * ) Notice: Subject to any disclaimer, the term of this patent is extended or adjusted under 35 U.S.C. 154(b) by 212 days.

(21) Appl. No.: 15/333,689

(22) Filed: Oct. 25, 2016

(65) Prior Publication Data

US 2018/0112984 A1 Apr. 26, 2018

(51) Int. Cl.
*G01C 21/04* (2006.01)
*H04W 4/14* (2009.01)
*G01C 21/36* (2006.01)
*G01C 21/34* (2006.01)

(52) U.S. Cl.
CPC .............. *G01C 21/04* (2013.01); *H04W 4/14* (2013.01); *G01C 21/3423* (2013.01); *G01C 21/3644* (2013.01)

(58) Field of Classification Search
CPC ................... G01C 21/04; H04W 4/14
USPC ......................................... 701/421
See application file for complete search history.

(56) References Cited

U.S. PATENT DOCUMENTS

| 8,184,621 B2* | 5/2012 | Zhu ................... H04L 51/14 370/328 |
| 9,921,075 B2* | 3/2018 | Teraguchi .......... G01C 21/3626 |
| 2003/0212479 A1* | 11/2003 | Baghshomali ......... G01C 21/26 701/24 |
| 2007/0198276 A1* | 8/2007 | Hinrichs ............... G06Q 10/02 705/5 |
| 2011/0244888 A1* | 10/2011 | Ohki ..................... G01C 21/362 455/456.2 |
| 2015/0338231 A1* | 11/2015 | Teraguchi .......... G01C 21/3611 701/540 |

* cited by examiner

*Primary Examiner* — Muhammad Shafi
(74) *Attorney, Agent, or Firm* — Baker Botts L.L.P.

(57) ABSTRACT

A method includes determining a user origination point and a destination point using a message received from a client device associated with a user, the message being transmitted over an Short Message Service (SMS) protocol. The method further includes determining a route between the user origination point and the destination point, the route comprising a plurality of instructions to direct the user from the user origination point to a checkpoint along the route. The method further includes formatting the plurality of instructions for display in an SMS messaging application on the client device. The method further includes transmitting the formatted plurality of instructions over the SMS protocol to the client device.

20 Claims, 6 Drawing Sheets

NAVIGATION VIA SHORT MESSAGE SERVICE

BACKGROUND

The present disclosure relates to mobile directions, and, more specifically, to systems and methods for determining and transmitting routes over an Short Message Service (SMS) protocol.

People in developing countries often do not have the luxury of access to many modern technologies. However, access to mobile phones in these areas is outpacing the availability of data networks. As a result, most mobile phone users have no data but instead rely on voice, SMS, or Unstructured Supplementary Service Data (USSD) to communicate. As mobile devices continue to become more prevalent in developing countries, users of such devices will continue to have navigation issues without access to data.

Accordingly, there is a need for a system that provides a user with actionable information for navigation in developing areas. The present disclosure describes a system and method for determining a requested route including instructions from an origination point to a destination point. Upon a request received via SMS, some systems and methods of the present disclosure may generate the route and format it for display in an SMS messaging application on the requesting device. Furthermore, systems and methods of the present disclosure may transmit the formatted route over an SMS protocol to the requesting device.

BRIEF SUMMARY

According to an aspect of the present disclosure, a method may include several processes. In particular, the method may include determining, using one or more processors, a user origination point and a destination point using a message received from a client device associated with a user, the message being transmitted over an Short Message Service (SMS) protocol. The method may also include determining, using one or more processors, a route between the user origination point and the destination point, the route comprising a plurality of instructions to direct the user from the user origination point to a checkpoint along the route. The method may further include formatting, using one or more processors, the plurality of instructions for display in an SMS messaging application on the client device. The method may further include transmitting the formatted plurality of instructions over the SMS protocol to the client device.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements of a non-limiting embodiment of the present disclosure.

DETAILED DESCRIPTION

Figure 1:
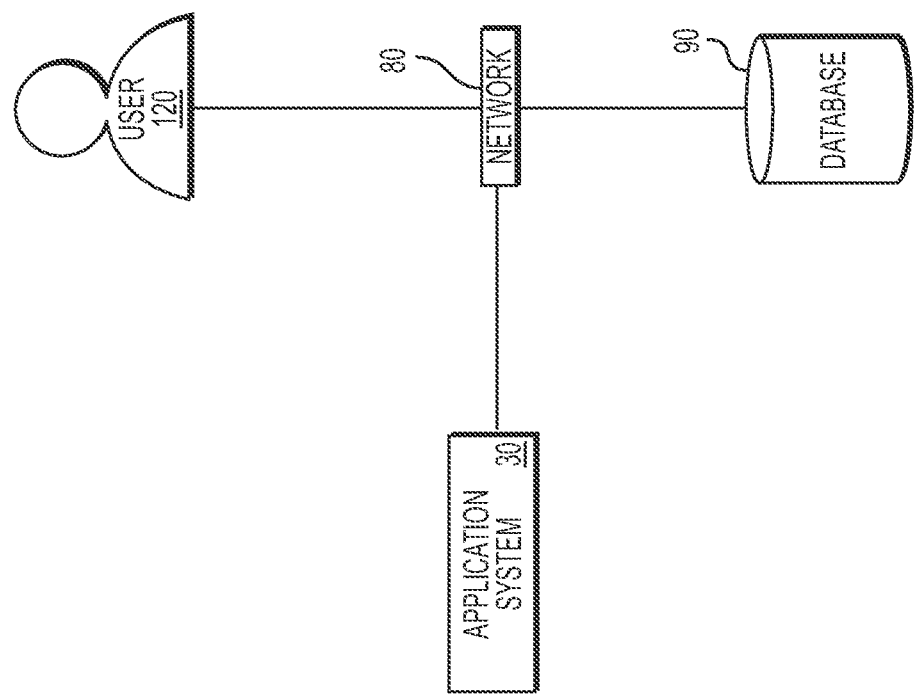
FIG. 1 is a schematic representation of an application system ecosystem of a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Each activity in the present disclosure may be executed on one, some, or all of one or more processors. In some non-limiting embodiments of the present disclosure, difference activities may be executed on different processors.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to route determination for mobile devices, systems and methods disclosed herein may be related to any field. Moreover, certain examples disclosed herein may be described with respect to airline services, commercial delivery services, consumer electronics, or any other field that may involve direction determination components. Certain embodiments described in the present disclosure are merely provided as example implementations of the processes described herein.

Navigation guidance for mobile phone users is an issue in developing countries across the globe. Oftentimes these users do not have access to the internet, a data network, Google maps, or Apple maps. Systems and methods disclosed herein may receive navigation requests from mobile devices over an SMS protocol. Further, systems and methods disclosed herein may generate directions and format instructions for transmission to the mobile devices over the SMS protocol.

The teachings of the present disclosure may reference specific example "objects." For example, an "object" can include a car, truck, boat, plane, rail vehicle, transport, and the like. In certain embodiments, "object" or "device" may refer to a smartphone, Global Positioning System (GPS) device, satellite communication terminal, radio communication terminal, or any other device capable of estimating or tracking location or motion data. For example, a mobile device may be equipped with an accelerometer and GPS system for interfacing with applications or websites. Any movable or moving object with such capabilities is contemplated within the scope of the present disclosure.

In a first example, systems and methods disclosed herein may determine a user origination point and a destination point using a message received from a client device associated with a user. For example, the message may be transmitted over an SMS protocol. For example, systems and methods disclosed herein may determine a route between the user origination point and the destination point. The route may involve a plurality of instructions to direct the user from the user origination point to a checkpoint along the route. Systems and methods disclosed herein may format the plurality of instructions for display in an SMS messaging application on the client device and transmit the formatted plurality of instructions over the SMS protocol to the client device.

In a second example, non-limiting embodiments of the present disclosure may determine a user origination point and a destination point using a message received from a client device associated with a user. For example, the message may be transmitted over an SMS protocol. Systems and methods disclosed herein may determine a route between the user origination point and the destination point. For example, the route may involve a plurality of instructions to direct the user from the user origination point to a checkpoint along the route. In some non-limiting embodiments of the present disclosure, the plurality of instructions may comprise (1) an azimuth between a current direction of the user and the checkpoint and (2) a distance between the user origination point and the checkpoint. For example, systems and methods disclosed herein may format the plurality of instructions for display in an SMS messaging application on the client device. In some non-limiting embodiments, systems and methods disclosed herein may transmit the formatted plurality of instructions over the SMS protocol to the client device.

In a third example, systems and methods disclosed herein may determine a user origination point and a destination point using a message received from a client device associated with a user, the message being transmitted over an SMS protocol. For example, systems and methods disclosed herein may determine a route between the user origination point and the destination point, and the route may comprise a plurality of instructions to direct the user from the user origination point to a first checkpoint along the route. For example, the plurality of instructions may comprise (1) an azimuth between a current direction of the user and the first checkpoint and (2) a distance between the user origination point and the first checkpoint. Systems and methods disclosed herein may format the plurality of instructions for display in an SMS messaging application on the client device and transmit the formatted plurality of instructions over the SMS protocol to the client device. For example, systems and methods disclosed herein may send a plurality of SMS messages to the client device. In some non-limiting embodiments of the present disclosure, SMS messages may comprise a respective portion of the plurality of instructions, and the plurality of instructions may comprise directions for navigating between two consecutive checkpoints in a series of checkpoints along the route. In some non-limiting embodiments of the present disclosure, the series of checkpoints may comprise the first checkpoint along the route.

Some non-limiting implementations of the present disclosure may utilize GPS-enabled, Wi-Fi/Cellular transmitters that are attached to a plurality of objects or devices in motion, and such transmitters may be used to track or transmit the relative positions of each of the plurality of objects in motion. Such objects may include mobile devices such as cell phones and laptops, as well as enabled vehicles.

Referring now to FIG. 1, an application system ecosystem of a non-limiting embodiment of the present disclosure is illustrated. An application system 30 may be connected to a database 90 and user 120 via a network 80.

Network 80 may comprise one or more entities, which may be public, private, or community based. Network 80 may permit the exchange of information and services among users/entities that are connected to such network 80. In certain configurations, network 80 may be a local area network, such as an intranet. Further, network 80 may be a closed and/or private network/cloud in certain configurations, and an open network/cloud in other configurations. Network 80 may facilitate wired or wireless communications of information and provisioning of services among users that are connected to network 80.

Network 80 may comprise one or more clouds, which may be public clouds, private clouds, or community clouds. Each cloud may permit the exchange of information and the provisioning of services among devices and/or applications that are connected to such clouds. Network 80 may include a wide area network, such as the Internet; a local area network, such as an intranet; a cellular network, such as a network using CDMA, GSM, 3G, 4G, LTE, or other protocols; a machine-to-machine network, such as a network using the MQTT protocol; another type of network; or some combination of the aforementioned networks. Network 80 may be a closed, private network, an open network, or some combination thereof and may facilitate wired or wireless communications of information among devices and/or applications connected thereto.

Network 80 may include a plurality of devices, which may be physical devices, virtual devices (e.g., applications running on physical devices that function similarly to one or more physical device), or some combination thereof. The devices within network 80 may include, for example, one or more of general purpose computing devices, specialized computing devices, mobile devices, wired devices, wireless devices, passive devices, routers, switches, mainframe devices, monitoring devices, infrastructure devices, other devices configured to provide information to and/or receive information from service providers and users, and software implementations of such.

In addition, application system 30 may use network 80 to communicate with a user 120. In some non-limiting embodiments of the present disclosure, user 120 may represent a single user or a plurality of users. User 120 may communicate with application system 30 via network 80 using a device such as, for example, a cellular phone, a tablet, a laptop, and other portable devices. Mobile devices may each be associated with a cellular network provider. In some non-limiting embodiments of the present disclosure, all the mobile devices that send information to the application system 30 may be serviced on a singular cellular network provider. In other non-limiting embodiments, mobile devices may be on multiple cellular network providers. Mobile devices may be powered by a mobile operating system, such as Apple Inc.'s iOS® mobile operating system or Google Inc.'s Android® mobile operating system, for example. In some non-limiting embodiments of the present disclosure, mobile devices may determine their own GPS position information and provide such data to the application system 30 through direct communication or via the network 80. In some non-limiting embodiments, mobile devices may not have access to mapping applications such as Google Maps or Apple Maps. In some non-limiting embodiments, mobile devices may communicate with application system 30 over an SMS protocol. In some non-limiting embodiments, mobile devices may communicate with application system 30 using a cellular network, such as 3G or LTE, for example, or other communication protocols or methods, such as Wi-Fi or NFC, for example. Further, mobile devices may include one or more applications that provide a user interface, which may display alerts, alarms, and/or notifications disclosed herein, and which may provide one or more options for determining location and direction (e.g., requesting directions to a certain location, receiving and displaying directions, receiving revised directions, etc.) identified in alerts, requests, and/or notifications. Signal, as referenced herein, may refer to signal of a network provider, a Wi-Fi network, or any other service provider.

The application system environment may also include a database 90 which may include, for example, additional servers, data storage, and resources. Application system 30 may receive additional data from database 90. Application system 30 may also store account information, location information, direction requests, notifications and any information regarding mapping or route processes on the database 90. Database 90 may be any conventional database or data infrastructure. For example, database 90 may include scaled out data architectures (i.e., Apache Hadoop) and/or persistent, immutable stores/logging systems.

Figure 2:
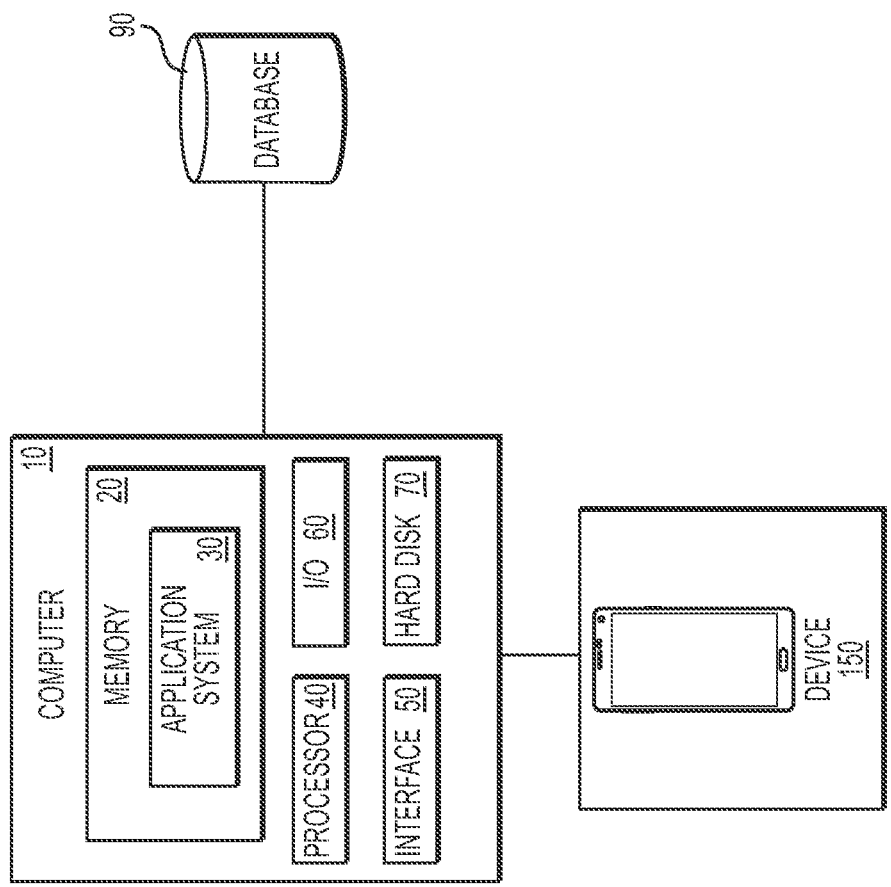
FIG. 2 is a schematic representation of an application system configured to interact with a device.

Referring to FIG. 2, the application system 30 of a non-limiting embodiment of the present disclosure is displayed. Computer 10 may reside on one or more networks. Computer 10 may comprise a memory 20, a central processing unit, an input and output ("I/O") device 60, a processor 40, an interface 50, and a hard disk 70. Memory 20 may store computer-readable instructions that may instruct computer 10 to perform certain processes. In particular, memory 20 may store a plurality of application programs that are under development. Memory 20 also may store a plurality of scripts that include one or more testing processes for evaluation of the applications. When computer-readable instructions, such as an application program or a script, are executed by the CPU, the computer-readable instructions stored in memory 20 may instruct the CPU to perform a plurality of functions. Examples of such functions are described below with respect to FIGS. 3-6. In some non-limiting embodiments of the present disclosure, the CPU may be application system 30. In some implementations, when computer-readable instructions, such as an application program or a script, are executed by the application system 30, the computer-readable instructions stored in memory 20 may instruct the application system 30 to perform a plurality of functions.

I/O device 60 may receive data from network 80, local database 95, data from other devices and sensors connected to computer 10, and input from a user and provide such information to the application system 30. I/O device 60 may transmit data to network 80, database 90, and/or a local database. I/O device 60 may transmit data to other devices connected to computer 10, and may transmit information to a user (e.g., display the information, send an e-mail, make a sound). Further, I/O device 60 may implement one or more of wireless and wired communication between computer 10 or application system 30 and other devices within or external to network 80. I/O device 60 may receive one or more of data from another server or a network 80. The computer 10 may be a processing system, a server, a plurality of servers, or any combination thereof.

Application system 30 may be located on the cloud or on an external network. In some non-limiting embodiments, application system 30 may be partially located on a mobile device and partially on the cloud or a network, or any combination thereof. Furthermore, some non-limiting configurations of application system 30 may be located exclusively on a user's device, such as, for example a mobile device or tablet. Application system 30 may also be accessed by a user on a device 150 such as any type of computing device, for example, a mobile telephone or a tablet.

Further referring to FIG. 2, device 150 may represent a single mobile device or a plurality of mobile devices, for example. In some non-limiting embodiments of the present disclosure, a mobile application may be installed on the device 150. The mobile application may facilitate communication with application system 30, database 90, or any other entity. In some non-limiting embodiments, the mobile application on device 150 may track, record, and report information to the application system 30. In systems and methods of the present disclosure, the device 150 may not be connected to a data network while in communication with application system 30.

Device 150 may communicate with application system 30 over an SMS protocol. Device 150 may send location information, requests, and/or data to application system 30. Location information may include GPS data, network location data, and/or latitude and longitude data. Any data or location information may be uploaded to a cloud database, stored locally on device 150, transmitted directly to the application system 30, or stored in any other database facility.

In some non-limiting embodiments, device 150 may store route information or data sent from application system 30 locally on the device 150. In some non-limiting embodiments of the present disclosure, a mobile application may manage routes, direction data, and corresponding location information on the device 150. The mobile application may maintain an offline copy of all information. In some systems and methods of the present disclosure, application system 30 may rely on information in a cloud database. Application system 30 may store route information, requests, directions, and any information in the cloud database or on database 90.

Location information may include GPS data and cellular network base station triangulation data. In some non-limiting embodiments of the present disclosure, location of a device 150 may be determined via multilateration of radio signals between multiple cell towers of a network and the device 150. The device 150 may emit at least the roaming signal to contact the next nearby antenna tower, but the process does not require an active call. Any other type of mobile phone location tracking, whether network-based, handset-based, SIM-based, Wi-Fi based, or hybrid based, is considered by the present disclosure.

Figure 3:
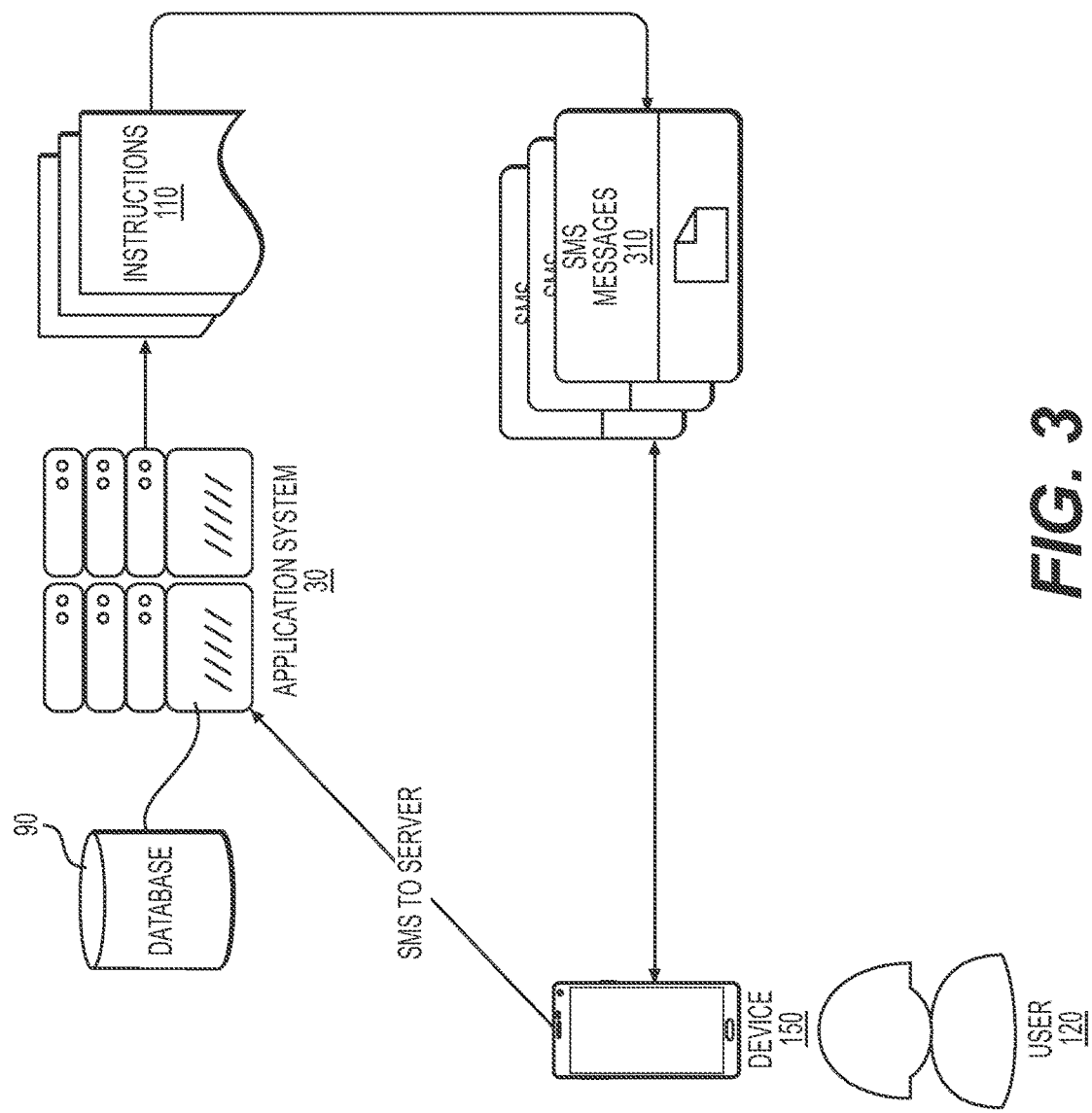
FIG. 3 illustrates an application system interacting with a user's device according to a non-limiting embodiment of the present disclosure.

FIG. 3 illustrates an application system interacting with a user's device according to a non-limiting embodiment of the present disclosure. A user 120 may use device 150 to communicate with application system 30. In some non-limiting embodiments of the present disclosure, all communications between user 120 and application system 30 may be via a mobile application on the device 150. In other non-limiting embodiments, user 120 may utilize device 150 to send SMS messages directly to application system 30. Application system may determine a user origination point and a destination point using a message received from a device 150. Device 150 may be associated with a user. Device 150 may transmit the message to application system 30 over an SMS protocol. In some non-limiting embodiments of the present disclosure, an application on device 150 may transmit the message to the application system 30.

Application system 30 may determine a route between the user origination point and the destination point. The user origination point may be a location of the device 150 with the user 120. In some non-limiting embodiments, a user 120 may request a user origination point that is not the user's current location. In addition, a user 120 may indicate in the request for directions that the directions should be sent to another device other than device 150.

Application system 30 may determine multiple instructions 110 for the route to direct the user from the user origination point to a checkpoint along the route. In some non-limiting embodiments, application system 30 may determine that there is a single instruction. The route may include multiple checkpoints, a single checkpoint, or no checkpoints. If there are no checkpoints, a generated instruction may indicate that the route from the user origination point to the destination point is a straight line if depicted on a map. The application system 30 may rely on any information in the database 90 to determine the instructions 110 or any part of the route. In some non-limiting embodiments, application system 30 may rely on a third party mapping API and received GPS data to determine the route.

Application system 30 may format multiple instructions 110 for display in an SMS messaging application on the client device. Application system 30 may format instructions 110 for display as SMS messages 310. In some non-limiting embodiments, application system 30 may format the instructions in other messaging formats for display on device 150. In some non-limiting embodiments of the present disclosure, application system 30 may pretty print the route so it can be displayed on the device 150 in SMS format.

In addition, in some non-limiting embodiments of the present disclosure, application system 30 may transmit the formatted instructions as SMS messages 310 to the device 150. Some systems and methods herein include wherein the application system 30 may use Twilio APIs for sending messages to the device 150. Device 150 may be able to display SMS messages 310 to the user 120 in order to facilitate the instructions 110 initiated by application system 30. In some non-limiting embodiments, application system 30 may communicate with device 150 without an interne connection.

If a user 120 should become lost or not be able to decipher the instructions sent from application system 30, the user 120 may send a request to application system 30 requesting directions to the destination point from a new user origination point. For example, application system 30 may determine a new user origination point from a second message received from the device 150 associated with user 120. In some non-limiting embodiments, device 150 may transmit the second message via SMS protocol. Application system 30 may determine a second route between the new user origination point and the destination point based on the second message. The second route may include multiple instructions to direct the user 120 from the new user origination point to a first checkpoint along the route. Application system 30 may format the multiple instructions for display in an SMS messaging application on the device 150. Application system 30 may transmit the formatted instructions over SMS protocol to the device 150. Device 150 may be enabled to display a portion of the instructions in a simple text message. In some non-limiting embodiments, an application on the device 150 may further format the instructions from application system 30 for display in a user interface (see, e.g., FIG. 6). In other non-limiting embodiments, an application on the device 150 may further be enabled to overlay directions on a general map. Device 150 may store general maps in a local database or access additional mapping elements on the network 80, application system 30, database 90, and the cloud database.

Figure 4:
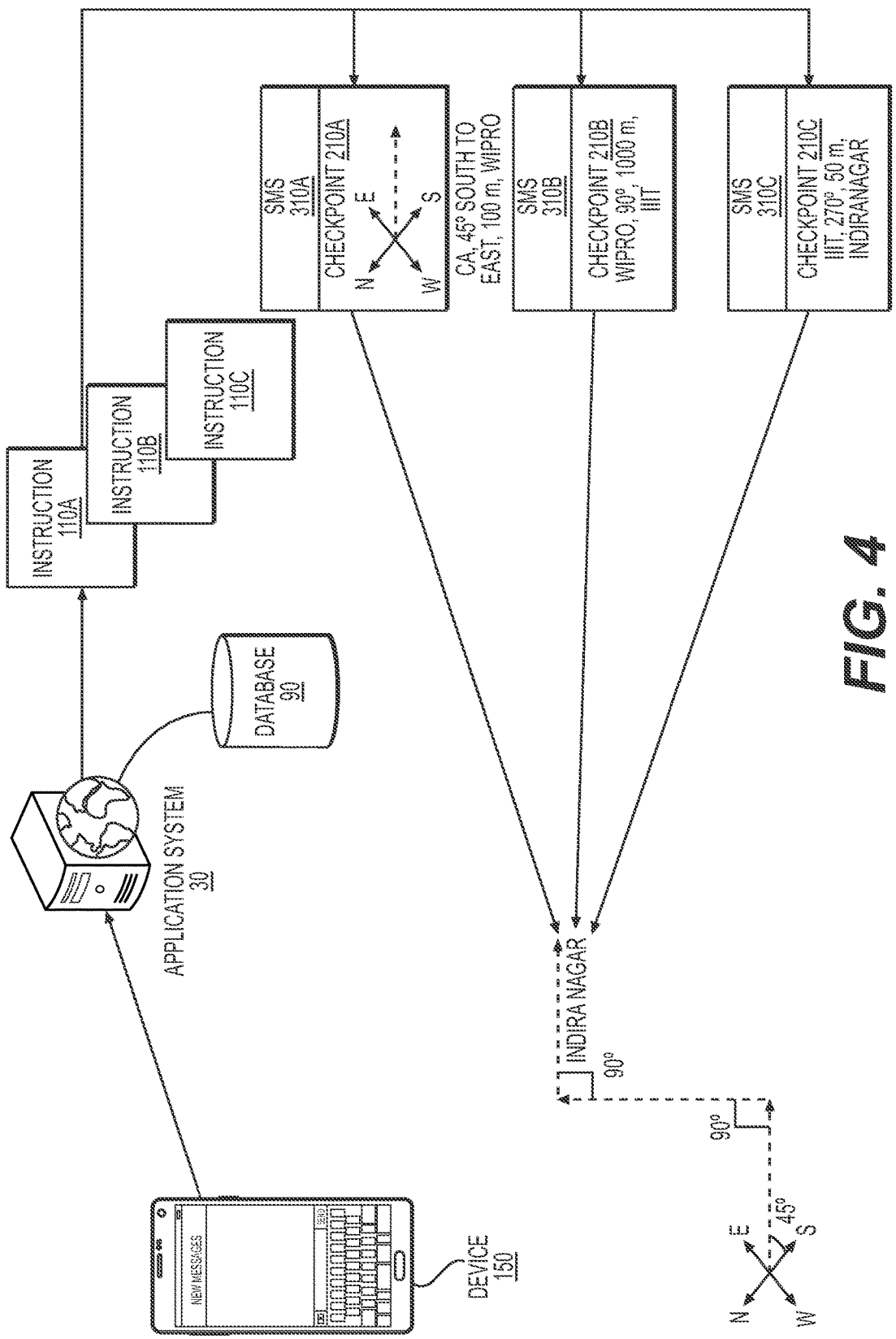
FIG. 4 details an application system sending instructions to a device in a non-limiting embodiment of the present disclosure.

FIG. 4 details an application system sending instructions to a device in a non-limiting embodiment of the present disclosure. In some non-limiting embodiments of the present disclosure, application system 30 may receive a message or request from a device 150 associated with a user 120. Application system 30 may determine a user origination point and a destination point using the message. The message may contain such information input by the user 120 or via components on the device 150. In addition, the message may be transmitted from device 150 over an Short Message Service (SMS) protocol to the application system 30.

Application system 30 may derive the user origination point and the designation point from the message. Further, application system 30 may determine a route between the user origination point and the destination point, and the route may include a plurality of instructions to direct the user from the user origination point to a checkpoint along the route, such as instructions 110A, 110B, and 110C. The number of checkpoints along the route may be determined by the application system 30 based on the distance between the user origination point, the destination point, and the amount of landmarks or signage throughout the distance. The destination point may include a name of a location, an address, and/or landmark. In some non-limiting embodiments of the present disclosure, however, there may be several checkpoints across a short distance because the route leads through an area with multiple turns, such as in a congested city. The plurality of instructions may include (1) an azimuth between a current direction of the user and the checkpoint and (2) a distance between the user origination point and the checkpoint.

In some non-limiting embodiments, the application system 30 may generate a plurality of instructions 110A, 110B, and 110C to direct the user from the user origination point to a checkpoint along the route. Instead of relying on offline map storage on device 150, application system 30 may generate the instructions using real time information unavailable to the device 150. Each of the instructions 110A, 110B, and 110C may include directions for navigating between two consecutive checkpoints in a series of checkpoints along the route. In other non-limiting embodiments, each of the instructions 110A, 110B, and 110C may include directions for navigating between multiple consecutive checkpoints in the series of checkpoints. The instructions 110A, 110B, and 110C may include an azimuth or any other directional description to communicate navigation.

In addition, one instruction may provide directions from between the user origination point and the first checkpoint in the series of checkpoints. Furthermore, one instruction may provide directions from the last checkpoint in the series of checkpoints to the destination point. In some non-limiting embodiments, the series of checkpoints may include the user origination point and the destination point as endpoints in the series.

The application system may format the instructions 110A, 110B, and 110C for display as SMS messages 310A, 310B, and 310C on the device 150. In some non-limiting embodiments of the present disclosure, each of the SMS messages 310A, 310B, and 310C may include a respective portion of the instructions 110A, 110B, and 110C to direct a user 120 between two endpoints of the route (i.e., from CA to Indira Nagar). For example. SMS 310A may provide a cardinal direction and instructions from the user origination point of CA to the checkpoint 210A of Wipro. SMS 310A may include instructions to head 45° south to east from CA for 100 meters until reaching checkpoint 210A of Wipro. SMS 310B may include instructions to turn 90° counter-clockwise to head on the bearing 45° north to east from Wipro for 1000 meters until reaching checkpoint 210B of IIIT. SMS 310C may include instructions to turn 90° clockwise to head on the original bearing 45° south to east from IIIT for 50 meters until reaching the user destination of Indira Nagar. Directions indicated by SMS messages 310A, 310B, and 310C may include any indication of direction (e.g., course or azimuth) and distance, and is not limited by the examples of the present disclosure.

Application system 30 may transmit the formatted SMS messages 310A, 310B, and 310C over the SMS protocol to the device 150. As depicted in FIG. 4, each of the SMS messages 310A, 310B, and 310C may comprise a respective portion of the plurality of instructions 110A, 110B, and 110C. Device 150 may display each instruction 110A, 110B, and 110C upon receiving the SMS messages 310A, 310B, and 310C. In some non-limiting embodiments, application system 30 may transmit multiple instructions to the device 150. In other non-limiting embodiments, application system 30 may transmit a first instruction to the device 150 and subsequent instructions upon determining the device 150 has reached the first checkpoint.

In some non-limiting embodiments of the present disclosure, device 150 may be enabled to assist the user 120 in completing each aspect of the navigation by assisting with direction, distance, and/or location. For example, device 150 may have a magnetic compass built in that may assist the user 120 in navigating the route. In addition, in some non-limiting embodiments of the present disclosure, device 150 may utilize data via GPS, assisted GPS, synthetic GPS, cell ID, a mesh network, Wi-Fi, inertial sensors (e.g., accelerometer and pedometer functions), barometer, ultrasound, Bluetooth, and terrestrial transmitters, applications, any capabilities of device 150, and/or any combination thereof. Further, device 150 may communicate any of this data to application system 30. For example, device 150 may be enabled to assist user 120 in determining distance between two checkpoints by tracking and displaying distance via a pedometer application.

Device 150 may also be enabled to receive feedback regarding the instructions sent by application system 30. For example, device 150 may receive feedback that a landmark or address utilized as a checkpoint no longer exists. In other cases, device 150 may receive feedback regarding the effectiveness of a route generated by application system 30. Any kind of feedback may be compiled and sent to application system 30. Application system 30 may store feedback in a database or in the cloud. In some non-limiting embodiments, application system 30 may use the feedback to configure future routes to provide improved navigation to users.

Figure 5:
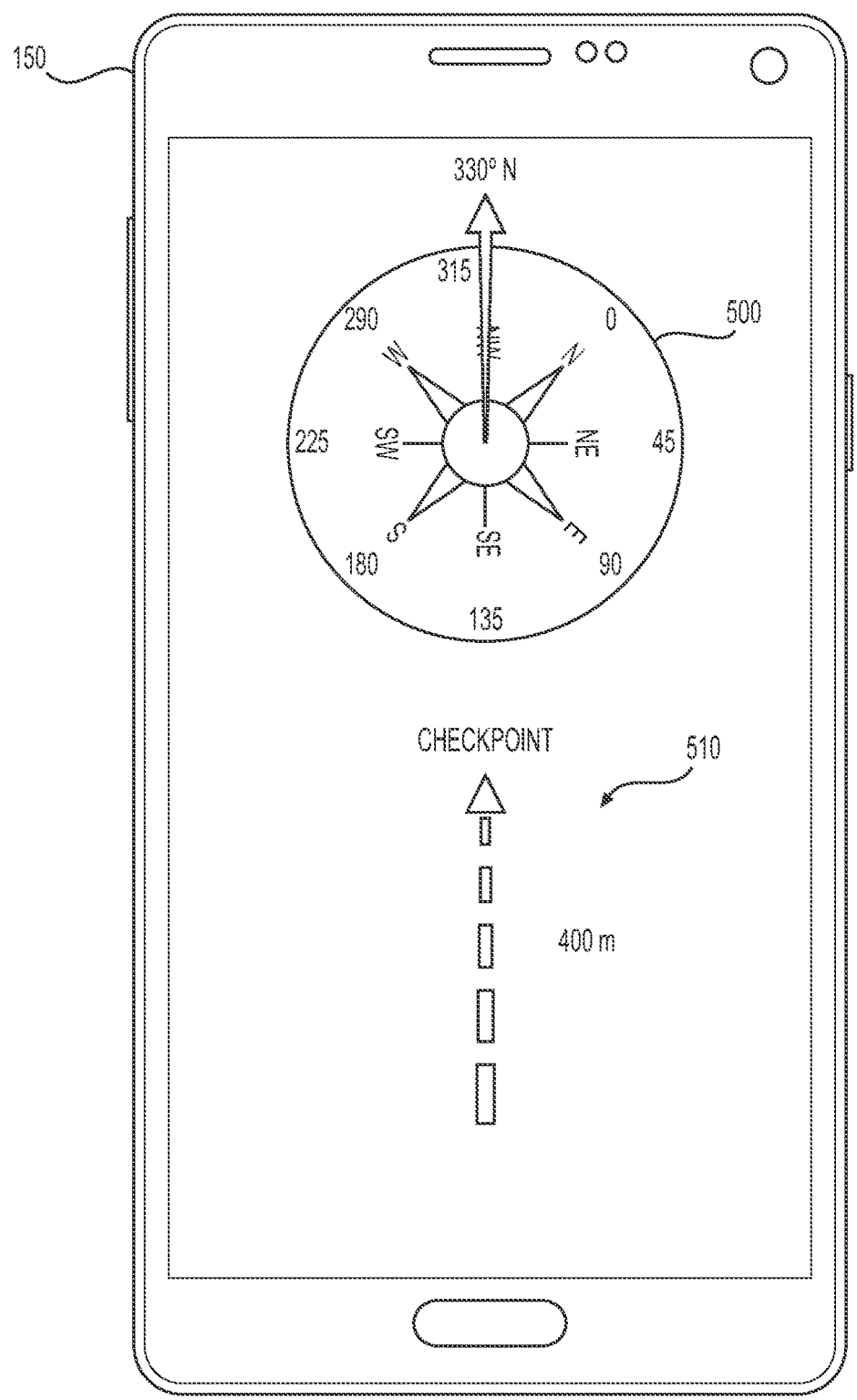
FIG. 5 illustrates an application depicted on a device in a non-limiting embodiment of the present disclosure.

FIG. 5 illustrates an application depicted on a device in a non-limiting embodiment of the present disclosure. In some non-limiting embodiments, device 150 may also format SMS messages 310A, 310B, and 310C for display in an application to assist the user 120 in navigating from the user origination point to the user destination. For example, device 150 may display a compass 500 with a current heading, desired heading, and cardinal directions. In addition, device 150 may display a distance 510 to a checkpoint determined by any method mentioned in the present disclosure, such as, for example, a pedometer built into the application or device 150. User 120 may rely on the application on the device 150 to navigate from the user origination point to the user destination. In some non-limiting embodiments of the present disclosure, the application may display an indication when the user 120 is heading the wrong way. For example, in addition to displaying a portion of the route, the device 150 may display a colored indicator representing a current direction of user 120 and a second indicator representing a desired direction according to the route. User 120 may utilize the application on device 150 to make minor corrections in direction and/or distance while traveling the route. In some non-limiting embodiments, the application device 150 may display the compass 500 and an overview of the route as depicted in FIG. 4.

Figure 6:
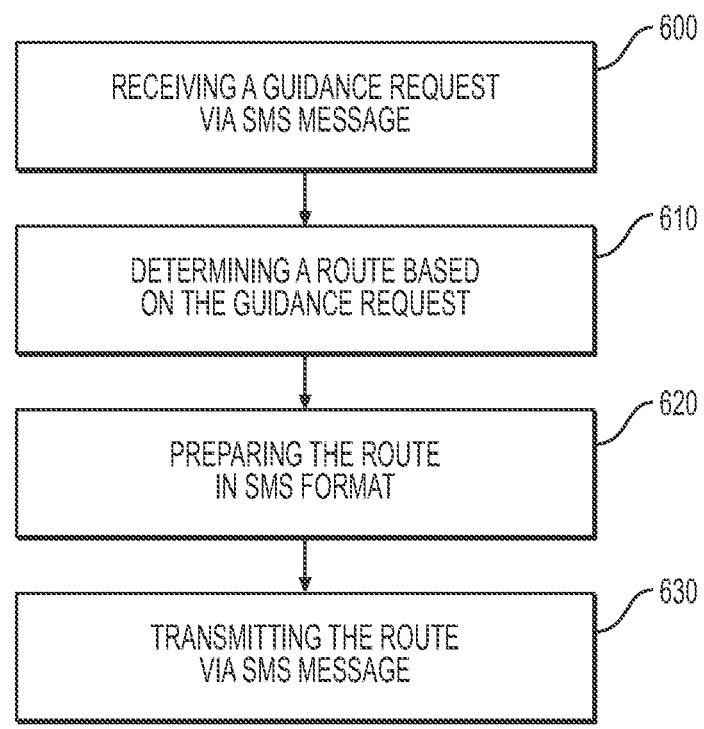
FIG. 6 is a flow chart for a method for determining and transmitting a route via an application system of a non-limiting embodiment of the present disclosure.

FIG. 6 is a flow chart for a method for determining and transmitting a route via an application system of a non-limiting embodiment of the present disclosure. In some non-limiting embodiments of the present disclosure, application system 30 may receive a guidance request via SMS message from a client device 150 operated by a user 120, as depicted in step 600. The guidance request may include a user origination point and a destination point. In some non-limiting embodiments, the guidance request received from the device 150 may include GPS data, latitude datum, and/or longitude datum.

In step 610, application system 30 may determine a route based on the guidance request. For example, application system may determine a route between the user origination point and the destination point. In determining the route, application system 30 may generate multiple instructions to direct the user from the user origination point to a checkpoint along the route, throughout a series of checkpoints, and from a checkpoint to the destination point. In some non-limiting embodiments, application system 30 may determine multiple landmarks from the user origination point to the destination point, and select a series of checkpoints along the route based on the multiple landmarks.

In step 620, application system 30 may prepare the route in SMS format for transmission to the device 150. In some non-limiting embodiments, application system 30 may format the instructions for display in an SMS messaging application on the device 150. In step 630, application system 30 may transmit the route via SMS message to the device 150. In some non-limiting embodiments, the device 150 may have an application to facilitate display of the route.

The flowcharts and diagrams in FIGS. 1-6 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "each" means "each and every" or "each of a subset of every," unless context clearly indicates otherwise.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method, comprising:
    determining, using one or more processors, a user origination point and a destination point using a message received from a client device associated with a user, the message being transmitted over an Short Message Service (SMS) protocol;
    determining, using one or more processors, a route between the user origination point and the destination point, the route comprising a plurality of instructions to direct the user from the user origination point to a checkpoint along the route;
    formatting, using one or more processors, the plurality of instructions for display in an SMS messaging application on the client device; and transmitting, using one or more processors, the formatted plurality of instructions over the SMS protocol to the client device.

2. The method of claim 1, wherein the plurality of instructions comprise (1) an azimuth between a current direction of the user and the checkpoint and (2) a distance between the user origination point and the checkpoint.

3. The method of claim 1, wherein transmitting the formatted plurality of instructions over the SMS protocol to the client device comprises:
sending a plurality of SMS messages to the client device, each of the SMS messages comprising a respective portion of the plurality of instructions, the plurality of instructions comprising directions for navigating between two consecutive checkpoints in a series of checkpoints along the route.

4. The method of claim 3, wherein the plurality of instructions comprise an azimuth for navigating between the two consecutive checkpoints of the series of checkpoints along the route.

5. The method of claim 3, wherein the client device is not connected to a data network.

6. The method of claim 1, wherein the message received from the client device associated with the user comprises Global Positioning System (GPS) data.

7. The method of claim 1, wherein the user origination point comprises latitude datum and longitude datum.

8. The method of claim 1, wherein the destination point comprises a name of a location.

9. The method of claim 1, wherein determining the route between the user origination point and the destination point comprises:
determining a plurality of landmarks from the user origination point to the destination point; and
selecting a series of checkpoints along the route based on the plurality of landmarks, the series of checkpoints comprising the checkpoint.

10. The method of claim 1, further comprising:
determining a new user origination point from a second message received from the client device associated with the user, the second message being transmitted over the SMS protocol; and
determining a second route between the new user origination point and the destination point, the second route comprising a second plurality of instructions to direct the user from the new user origination point to a new checkpoint along the route;
formatting the second plurality of instructions for display in the SMS messaging application on the client device; and
transmitting the formatted second plurality of instructions over the SMS protocol to the client device.

11. The method of claim 1, wherein the user origination point is a location of the client device associated with the user.

12. A computer configured to access a storage device, the computer comprising:
a processor; and
a non-transitory, computer-readable storage medium storing computer-readable instructions that when executed by the processor cause the computer to perform:
determining a user origination point and a destination point using a message received from a client device associated with a user, the message being transmitted over an Short Message Service (SMS) protocol;
determining a route between the user origination point and the destination point, the route comprising a plurality of instructions to direct the user from the user origination point to a checkpoint along the route, wherein the plurality of instructions comprise (1) an azimuth between a current direction of the user and the checkpoint and (2) a distance between the user origination point and the checkpoint;
formatting the plurality of instructions for display in an SMS messaging application on the client device; and
transmitting the formatted plurality of instructions over the SMS protocol to the client device.

13. The computer of claim 12, wherein transmitting the formatted plurality of instructions over the SMS protocol to the client device comprises:
sending a plurality of SMS messages to the client device, each of the SMS messages comprising a respective portion of the plurality of instructions, the plurality of instructions comprising directions for navigating between two consecutive checkpoints in a series of checkpoints along the route.

14. The computer of claim 13, wherein the plurality of instructions comprise an azimuth for navigating between the two consecutive checkpoints of the series of checkpoints along the route.

15. The computer of claim 12, wherein the checkpoint comprises a first checkpoint, and further comprising:
determining a plurality of additional checkpoints along the route between the first checkpoint and the destination point and
wherein a total number of checkpoints, including the first checkpoint and the plurality of additional checkpoints, is determined based upon an amount of signage throughout a distance from the origination point to the destination point.

16. The computer of claim 12, wherein determining the route between the user origination point and the destination point comprises:
determining a plurality of landmarks from the user origination point to the destination point; and
selecting a series of checkpoints along the route based on the plurality of landmarks, the series of checkpoints comprising the checkpoint.

17. The computer of claim 12, wherein the message received from the client device associated with the user comprises Global Positioning System (GPS) data.

18. The computer of claim 12, wherein the user origination point comprises latitude datum and longitude datum.

19. The computer of claim 12, wherein the destination point comprises a name of a location.

20. A non-transitory computer-readable medium having instructions stored thereon that are executable by a computing system to perform operations comprising:
determining a user origination point and a destination point using a message received from a client device associated with a user, the message being transmitted over an Short Message Service (SMS) protocol;
determining a route between the user origination point and the destination point, the route comprising a plurality of instructions to direct the user from the user origination point to a checkpoint along the route, wherein the plurality of instructions comprise (1) an azimuth between a current direction of the user and the checkpoint and (2) a distance between the user origination point and the checkpoint;
formatting the plurality of instructions for display in an SMS messaging application on the client device; and transmitting the formatted plurality of instructions over the SMS protocol to the client device, wherein transmitting the formatted plurality of instructions comprises:
sending a plurality of SMS messages to the client device, each of the SMS messages comprising a respective portion of the plurality of instructions, the plurality of instructions comprising directions for navigating between two consecutive checkpoints in a series of checkpoints along the route, the series of checkpoints comprising the checkpoint.

* * * * *